United States Patent
Park

[11] Patent Number: 6,128,044
[45] Date of Patent: Oct. 3, 2000

[54] AUTOMATIC WIDE SCREEN DISPLAY METHOD AND APPARATUS FOR A TV SET

[75] Inventor: Jae-Young Park, Daeku, Rep. of Korea

[73] Assignee: LG Electronics Inc., Seoul, Rep. of Korea

[21] Appl. No.: 08/912,479

[22] Filed: Aug. 18, 1997

[30] Foreign Application Priority Data

Aug. 20, 1996 [KR] Rep. of Korea ............ 96-34335

[51] Int. Cl.$^7$ .................................. H04N 5/46
[52] U.S. Cl. ............................ 348/556; 348/558
[58] Field of Search ........................ 348/556, 558, 348/555, 554, 449, 426, 604; H04N 5/46, 3/27

[56] References Cited

U.S. PATENT DOCUMENTS

| | | | |
|---|---|---|---|
| 5,287,188 | 2/1994 | Saeger et al. | 348/565 |
| 5,347,318 | 9/1994 | Kobayashi et al. | 348/556 |
| 5,353,065 | 10/1994 | Katsumata et al. | 348/556 |
| 5,614,956 | 3/1997 | Matsuura | 348/558 |

FOREIGN PATENT DOCUMENTS 0707421  4/1996  European Pat. Off. .

*Primary Examiner*—Thomas G. Black
*Assistant Examiner*—Uyen Le
*Attorney, Agent, or Firm*—Birch, Stewart, Kolasch & Birch, LLP

[57] ABSTRACT

An automatic wide screen display apparatus and method of a TV set according to the present invention determine the presence of a wide screen video signal and detect an aspect ratio data of an inputted video signal based on the determination using a vertical synchronizing signal. The apparatus and method further perform communications using a protocol defined between a main microcomputer for controlling the screen deflection and an exclusive wide screen microcomputer for detecting the aspect ratio of the inputted video signal in order to automatically display the wide screen image in accordance with the inputted video signal, and control an integrated deflection device in accordance with the communication result to control the screen deflection.

24 Claims, 14 Drawing Sheets

FIG. 3
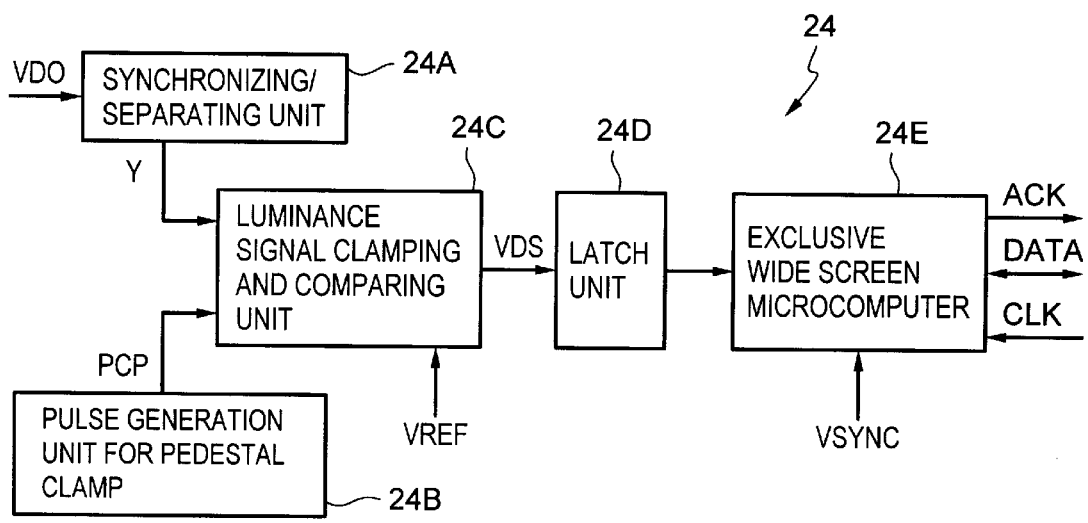
FIG. 4A  VSYNC
FIG. 4B  VDS
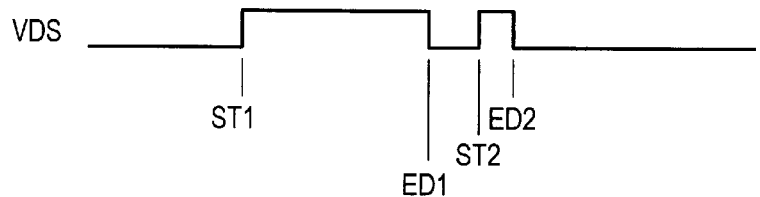
FIG. 5A  VSYNC
FIG. 5B
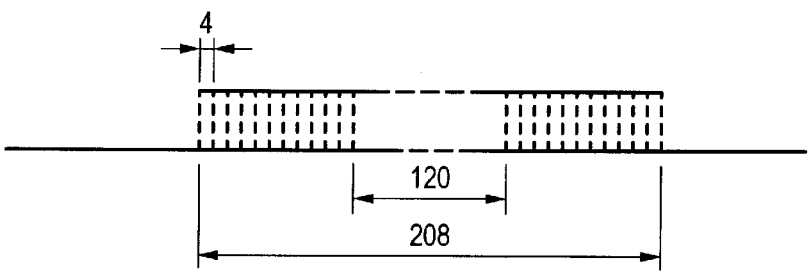

CLK

ACK

DATA

CLK

ACK

DATA

FIG.9A  -VSYNC 
FIG.9B  VDS 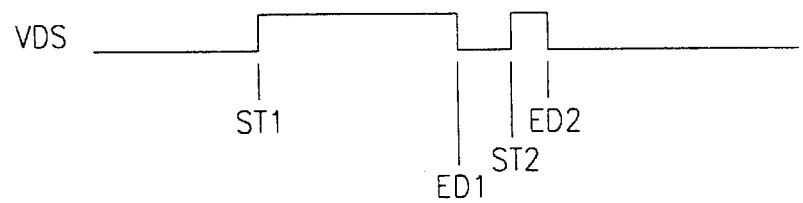

AUTOMATIC WIDE SCREEN DISPLAY METHOD AND APPARATUS FOR A TV SET

BACKGROUND OF THE INVENTION

1. Field of the Invention

The present invention relates to a wide screen display for a TV set, and in particular to an automatic wide screen display method and apparatus for a TV set capable of automatically displaying a wide screen image and controlling deflection of a color picture tube (hereinafter, CPT) by self-detection of an aspect ratio of an input video signal.

2. Description of the Conventional Art

FIG. 1 is a block diagram of a conventional wide screen display TV set. As shown therein, the conventional wide screen display TV set includes an antenna ANT for receiving high frequency video and audio signals transmitted from a broadcasting station where the video signals have an aspect ratio of 4:3, a tuner 11 for receiving the high frequency video and audio signals from the antenna ANT and outputting high frequency input video and audio signals VD1, AD1, a main microcomputer 13 for controlling the tuning operation of the tuner 11 and outputting a switching control signal SC in accordance with an input screen selection signal IS outputted from a remote control 12, an audio/video switching unit 14 for selecting and outputting a single signal among the input video and audio signals VD1, AD1 outputted from the tuner 11 or external input signals EXT1–EXT3 in accordance with the switching control signal SC, an integrated deflection device 15 for detecting color signals R, G, B of a baseband output video signal VD0 selectively outputted from the audio/video switching unit 14 and thereby outputting the color signals R, G, B to a CPT, and an integrated sound processing device 16 for detecting left and right stereo audio signals from an output audio signal AD0 selectively outputted from the audio/video switching unit 14 and thereby supplying the left and right stereo audio signals to left and right speakers SPL, SPR.

The operation of the conventional wide screen TV set display will now be described.

A high frequency video signal with the aspect ratio of 4:3 and an audio signal transmitted from a broadcasting station are received by the antenna ANT of the TV set and then supplied to the tuner 11, and the tuner 11 outputs intermediate frequency video and audio signals to the audio/video switching unit 14.

External input signals EXT1–EXT3 outputted from a video or an audio player, such as a laser disk player LDP or a VCR, are supplied to other input terminals of the audio/video switching unit 14.

Accordingly, when a user inputs to the main microcomputer 13 an input selection signal IS by using the remote control 12 or a key matrix, the main microcomputer 13 controls the switching operation of the audio/video switching unit 14 in accordance with the input selection signal IS, and the audio/video switching unit 14 selects and outputs a single signal among the input video and audio signals VD1, AD1 outputted from the tuner 11 or the external input signals EXT1–EXT3.

The output video signal VD0 selectively outputted from the audio/video switching unit 14 is converted to baseband color signals R, G, B by the integrated deflection device 15 to be displayed on the CPT, and the output audio signal AD0 is supplied to the left and right speakers SPL, SPR through the integrated sound processing device 16.

For example, if the user outputs a wide mode selection signal by using the remote control 12, the main microcomputer 13 acknowledges the wide mode selection signal and controls deflection of the integrated deflection device 15, whereby a wide screen image is displayed on the CPT.

However, in the case where a video signal having a certain aspect ratio is desired to be displayed on the entire wide screen of a general TV set provided with the wide screen display function, the user has to manually change the wide mode selection key and, when the aspect ratio of inputted video signal is changed, the wide mode selection key has to be operated manually to adjust the aspect ratio for displaying the inputted video signal, thereby causing inconvenience. In addition, since the wide mode of a conventional TV set is limited to such as a 4:3 mode, a spectacle mode, a wide mode, a zoom 1 mode, and a zoom 2 mode, etc., depending upon the aspect ratio, various screen displays can not be achieved.

SUMMARY OF THE INVENTION

Accordingly, it is an object of the present invention to provide an automatic wide screen display method and apparatus for a TV set capable of automatically displaying a wide screen image by performing self-detection of an aspect ratio of an input video and controlling the deflection of a CPT in order to output images with various aspect ratios.

To achieve the above and other objects, there is provided an automatic wide screen display method including a first step for judging whether or not there is an image signal by using a luminance signal component of an inputted video signal and detecting an aspect ratio data of the inputted video signal synchronized by a vertical synchronizing signal, a second step for communicating by using a defined protocol to control aspect ratio between a main microcomputer controlling deflection and an exclusive wide screen microcomputer, and a third step for controlling deflection of an integrated deflection device on the basis of a result of communicating with the exclusive wide screen microcomputer by using the protocol, whereby a wide screen image can be automatically displayed.

To achieve the above and other objects, in a TV set provided with a wide screen display function which displays a wide screen image by selecting a certain input signal among a broadcasting signal and a plurality of external input signals, there is provided an automatic wide screen display apparatus including a main microcomputer for controlling a deflection data signal of an integrated deflection device in order to display a screen image which accords with a corresponding aspect ratio of the inputted video signal on the basis of a screen information signal outputted from a wide screen detection unit while communicating with the wide screen detection unit by using a certain protocol, and the wide screen detection unit for judging whether or not there is a screen information signal by using a luminance signal component of the inputted video signal and controlled by the main microcomputer and detecting an aspect ratio data of the inputted video signal synchronized by a vertical synchronizing signal, for thereby periodically outputting the aspect ratio data signal to the main microcomputer.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 3 is a detailed block diagram of a wide screen detection unit in the apparatus of FIG. 2;

FIGS. 4A and 4B are waveform diagrams of signals inputted to an exclusive wide screen microcomputer in the apparatus of FIG. 2;

FIGS. 5A and 5B are waveform diagrams illustrating the image signal of FIGS. 4A and 4B, respectively divided into each defined mode;

FIGS. 9A and 9B are waveform diagrams of a signal inputted to the exclusive wide screen microcomputer in the apparatus of FIG. 2;

DETAILED DESCRIPTION OF THE INVENTION

Figure 1:
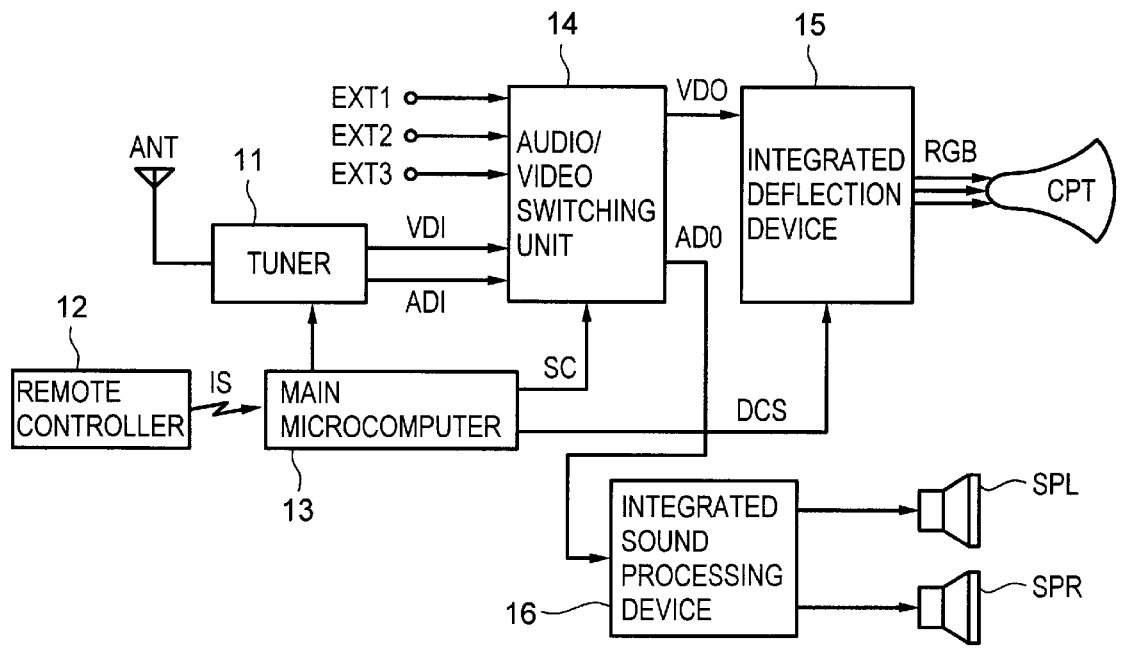
FIG. 1 is a block diagram of a conventional wide screen TV set display.
Figure 2:
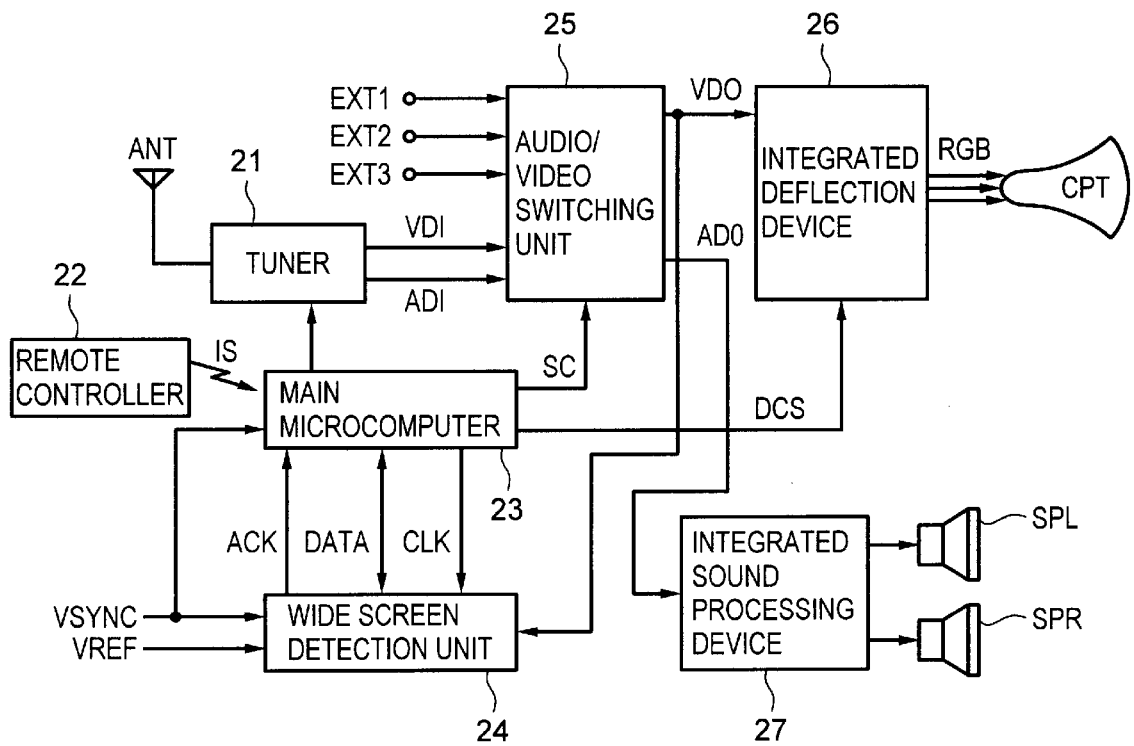
FIG. 2 is a block diagram of an embodiment of an automatic wide screen display apparatus for a TV set according to the present invention.

FIG. 2 is a block diagram of an embodiment of an automatic wide screen display apparatus for a TV set according to the present invention. As shown therein, the automatic wide screen display apparatus includes an antenna ANT for receiving high frequency video and audio signals transmitted form a broadcasting station, an aspect ratio of the video signal being 4:3; a tuner 21 for receiving the high frequency video and audio signals from the antenna ANT and outputting high frequency input video and audio signals VD1, AD1; a main microcomputer 23 for controlling the tuning operation of the tuner 21, outputting a switching control signal SC in accordance with an input video selection signal IS outputted from a remote control 22, and outputting a deflection control signal DCS in order to display an image which corresponds in aspect ratio to the input video signal VD1; a wide screen detection unit 24 for detecting an aspect ratio data signal from the input video signal VD1 and thereby periodically outputting the aspect ratio data signal to the main microcomputer 23; an audio/video switching unit 25 for selecting and outputting a single signal among the input video and audio signals VD1, AD1 outputted from the tuner 21 or external input signals EXT1–EXT3 in accordance with the switching control signal SC; an integrated deflection device 26 for detecting baseband color signals R, G, B from an output video signal VD0 selectively outputted from the audio/video switching unit 25 and thereby outputting the color signals R, G, B to a CPT; and an integrated sound processing device 27 for detecting left and right stereo audio signals from an output audio signal AD0 selectively outputted from the audio/video switching unit 25 and thereby supplying the left and right stereo audio signals to left and right speakers SPL, SPR.

With reference to the accompanying drawings, the operation of the automatic wide screen display apparatus according to the present invention will now be described in detail.

First, high frequency video and audio signals transmitted from a broadcasting station, an aspect ratio of the video signal being 4:3, are received at the antenna ANT of the TV set and then supplied to the tuner 21, and the tuner 21 upon receiving the high frequency video and audio signals outputs intermediate frequency video and audio signals to the audio/video switching unit 25.

External input signals EXT1–EXT3 outputted from a video or an audio player such as a laser disk player LDP or a VCR are supplied to other input terminals of the audio/video switching unit 25.

When the user inputs an input selection signal IS by using the remote control 22, the main microcomputer 23 outputs a switching control signal SC in accordance with the input selection signal IS which controls the switching operation of the audio/video switching unit 25, and the audio/video switching unit 25 selects and outputs a single signal among the input video and audio signals VD1, AD1 outputted from the tuner 21 and the external input signals EXT1–EXT3.

An output video signal VD0 selectively outputted from the audio/video switching unit 25 based on the signal SC is converted into baseband color signals R, G, B by the integrated deflection device 26 to be displayed on the CPT, and an output audio signal AD0 is supplied to the left and right speakers SPL, SPR through the integrated sound processing device 27.

However, if the user outputs an automatic wide mode selection signal by using the remote control 22, the main microcomputer 23 acknowledges the automatic wide mode selection signal and drives the wide screen detection unit 24. Accordingly, if the wide screen detection unit 24 detects an aspect ratio data signal from the output video signal VD0 and outputs the detected aspect ratio data signal to the main microcomputer 23, the main microcomputer 23 outputs a deflection control signal DCS on the basis of the received aspect ratio data signal and controls the integrated deflection device 26, whereby a wide screen image is displayed on the CPT.

With reference to FIG. 3, the operation of the wide screen detection unit 24 will be described in detail.

First, a synchronizing/separating unit 24A synchronizes and separates a luminance signal component Y from a video signal selected by the user among the plurality of video signals VD0, and outputs a resultant signal to a luminance signal clamping and comparing unit 24C. A pulse generation unit for pedestal clamping 24B generates a pedestal clamp pulse PCP to the comparing unit 24C.

Then, the luminance signal clamping and comparing unit 24C clamps the luminance signal Y by using the pedestal clamp pulse PCP and compares the resultant signal with a reference voltage VREF. Here, if the clamped signal is greater than the reference voltage VREF, that is, if there exists a wide screen video signal, the luminance signal clamping and comparing unit 24C outputs a high level signal VDS, and, if the clamped signal is less than the reference voltage VREF, the luminance signal clamping and comparing unit 24 outputs a low level signal VDS.

A latch unit 24D latches the signal outputted from the luminance signal clamping and comparing unit 24C by using a D flip-flop or the like.

An exclusive wide screen microcomputer 24E detects an aspect ratio data with respect to the video signal, by using the above latched signal and a vertical synchronizing signal VSYNC inputted through an interrupt terminal. If an automatic wide mode is set by the user, the main microcomputer 23 requests the exclusive wide screen microcomputer 24E to periodically send an aspect ratio data to the microcomputer 23, whereby the exclusive wide screen microcomputer 24E transmits the above detected aspect ratio data to the main microcomputer 23 in accordance with a defined protocol.

As shown in FIGS. 4A and 4B, the exclusive wide screen microcomputer 24E is synchronized by the vertical synchronizing signal VSYNC, thereby detecting the aspect ratio data by using a video detection signal VDS for detecting the presence of a wide screen video signal. Namely, in order to know what aspect ratio the inputted video signal has, the exclusive wide screen microcomputer 24E detects a time ST1 of the first rising edge of the video detection signal VDS and a video end time ED1, and, for a detection signal with a caption component, the exclusive wide screen microcomputer 24E discriminates a caption start time ST2 and a caption end time ED2.

A communication protocol defined between the main microcomputer 23 and the exclusive wide screen microcomputer 24E is shown in Table 1. The main microcomputer 23 basically sends information of 4 bits to the exclusive wide screen microcomputer 24E, and the exclusive wide screen microcomputer 24E sends an aspect ratio data of the input video signal to the main microcomputer 23. The transmitting path and use of each data signal will be as follows.

TABLE 1 communication protocol defined between the main microcomputer and the exclusive wide screen microcomputer.

| DATA | Data from the main microcomputer to the exclusive wide screen microcomputer | Data from the exclusive wide screen microcomputer to the main microcomputer |
|---|---|---|
| 1 X - - - | 0: change of input | |
|  | 1: no change of input | |
| 2 - X - - | 0: no signal | |
|  | 1: signal | |
| 3 - - X - | 0: no change of V-H location in accordance with an aspect ratio mode | |
|  | 1: change of V-H location in accordance with an aspect ratio mode | |

TABLE 1-continued communication protocol defined between the main microcomputer and the exclusive wide screen microcomputer.

| | | |
|---|---|---|
| 4 - - - X | 0: input by ST1, ED1, or ED2 | |
| | 1: input by picture modes | |
| 5 X - - - | | 0: not 4:3 mode |
| | | 1: 4:3 mode |
| 6 - X - - | | 0: no caption |
| | | 1: caption |
| 7 - - B - | DATA 4  0 | ST1 data |
| | DATA 4  1 | picture mode data |
| 8 - - - B | DATA 4  0 | ED1 or ED2 data |
| | DATA 4  1 | no data |

(In Table 1, "X" implies a bit and "B", a byte.)

First, the data which is transferred from the main microcomputer 23 to the exclusive wide screen microcomputer 24E will now be described.

DATA 1: An information data bit used for making the exclusive wide screen microcomputer 24E discriminate the aspect ratio if the user changes the channel when an automatic wide screen mode has been already set, or if the user changes an input by using a TV/video key. When the channel or input is changed, the main microcomputer 23 transmits the data bit of "1", to the exclusive wide screen microcomputer 24E, then transmits the data bit of "0" until another channel or input change occurs. When the input is changed, only bits of DATA 1 to DATA 4 are transmitted.

DATA 2: An information data bit for giving information whether or not there is a displayable signal. That is, when it is judged that there is no video signal, the DATA 2 is used for preventing the exclusive wide screen microcomputer 24E from detecting the aspect ratio. If there is no video signal when the automatic wide mode is performed, the main microcomputer 23 sends only information of DATA 1 to DATA 4 bits to the exclusive wide screen microcomputer 24E. After that, the main microcomputer 23 does not receive data signals ST1, ED1/ED2, or a picture mode data, from the exclusive wide screen microcomputer 24E.

DATA 3: An information data bit indicating whether or not the center of the signal VDS for detecting video signal presence is changed when the exclusive wide screen microcomputer 24E detects the wide mode.

DATA 4: An information data bit indicating whether to request information about the start time and width of an image signal from the exclusive wide screen microcomputer 24E, or to request a picture mode information defined by each width of an image information. The main microcomputer 23 uses a single mode among the two modes, thereby setting the aspect ratio of an input video signal corresponding to the image size.

The data transferred from the exclusive wide screen microcomputer 24E to the main microcomputer 23 will now be described.

DATA 5: An information data bit indicating whether or not a current signal displayed on the CPT is received at the aspect ratio of 4:3. If the output video signal VD0 or externally inputted signals EXT1–XT3 have the aspect ratio of 4:3, DATA 5 becomes "1" and the main microcomputer 23 changes the wide mode to a spectacle mode. Accordingly, a caption information data or start and width data of the video signal have nothing to do with the display process.

DATA 6: An information data bit indicating whether or not there is a caption in the current signal displayed on the CPT. In case of a cinema or vista mode, when the caption is displayed over the video signal, a vertical amplitude deflection data can be set by a certain ratio. However, the information data bit is used since the vertical amplitude deflection data as well as a vertical shifting deflection data have to be set in a case where the caption is displayed at the lower part of the image separately from the video signal.

DATA 7: When the main microcomputer 23 outputs DATA 4 as "0", the number of horizontal synchronizing signals HSYNC present from the period starting from the vertical synchronizing signal VSYNC to the start point of the video signal are displayed. And, as shown in FIGS. 5A and 5B, in the case where DATA 4 is "1", when the width of the video signal corresponds to the width of a horizontal synchronizing signal HSYNC having 120 pulses or less, the picture mode is defined as "0", and when the width of the video signal corresponds to the width of the horizontal synchronizing signal HSYNC having 208 pulses or more, the picture mode is defined as "4:3". Starting from the horizontal synchronizing signal having 120 pulses, whenever the horizontal synchronizing signal is increased by 4 pulses, a picture mode is defined and a corresponding mode data is transmitted to the main microcomputer 23. Eventually, the above picture mode is divided by (208−120)/4, namely, 22 video modes, and transmitted to the main microcomputer 23.

DATA 8: An information data bit indicating the number of horizontal synchronizing signals HSYNC present in the duration starting from the start point to the end point of the input signal for detecting the presence of the signal VDS when the main microcomputer 23 sends DATA 4 as "0". If there is a caption, it indicates the number of the horizontal synchronizing signals HSYNC present until the end of the caption. However, when the main microcomputer 23 sends DATA 4 as "1", there is no need to send DATA 8.

The protocol data defined as above are used between the two microcomputers through e.g., three data lines according to the input and output directions of the defined terminals.

Figure 6A:
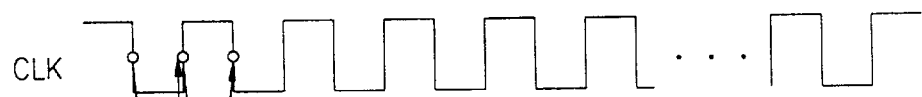
FIGS. 6A to 6C are waveform diagrams illustrating a data signal being transferred from a main microcomputer to the exclusive wide screen microcomputer in the apparatus of FIG. 2.
Figure 6B:
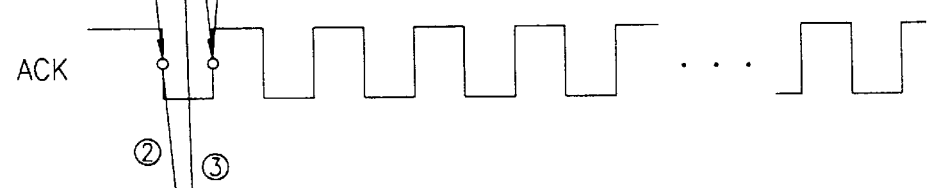
Figure 6C:
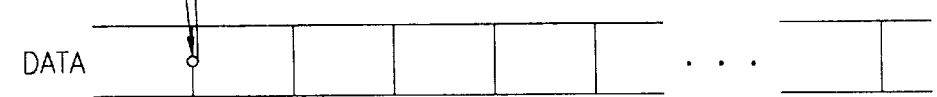

When the main microcomputer 23 sends data to the exclusive wide screen microcomputer 24E, as shown in FIGS. 6A and 6B, the timing of the communication protocol checks whether a clock signal CLK is set at a low level by the main microcomputer 23, and then an acknowledge signal ACK is set at a low level ( ). Here, the time to wait for the acknowledge signal ACK after the first clock signal CLk is set at the low level is defined as approximately 21 ms (83 $\mu$s 250), and the time until the communication is completed thereafter is approximately 4.5 ms (83 $\mu$s 250). Also, when the acknowledge signal ACK is set at a low level, the main microcomputer 23 sets the data which will be transmitted over a data line ( ). Also, in order to indicate that the data has been transmitted, the clock signal CLK is set at a high level( ). And the main microcomputer 24E waits until the acknowledge signal ACK is set at a high level. Here, the exclusive wide screen microcomputer 24E reads the data of the data line when the clock signal CLK is set at the high level, and sets the acknowledge signal ACK at a high level ( ). Finally, the acknowledge signal ACK is set at a high level and the clock signal at a low level ( ). This sequence is repeatedly carried out from step .

Figure 7A:
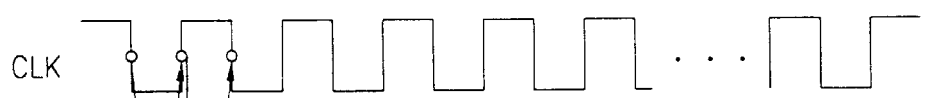
FIGS. 7A to 7C are wave form diagrams illustrating a data signal being transferred from the exclusive wide screen microcomputer to the main microcomputer in the apparatus of FIG. 2.
Figure 7B:
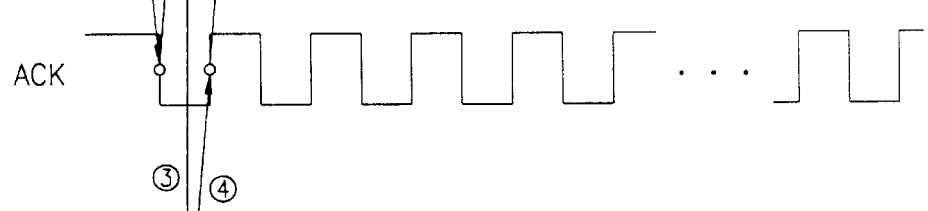
Figure 7C:
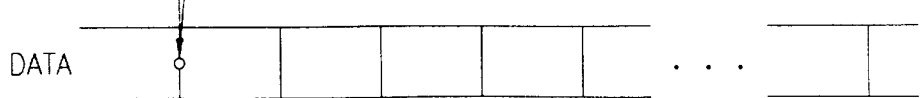

When a data is transmitted from the exclusive wide screen microcomputer 24E to the main microcomputer 23, the communication protocol is as shown in FIGS. 7A to 7C.

The main microcomputer 23 sets the clock signal CLK at a low level ( ), thereby informing that it is ready to receive a data. When the acknowledge signal ACK is set to a low level, the main microcomputer 23 again sets the clock signal at a high level to inform the exclusive wide screen microcomputer 24E to send a data ( ). Also, the exclusive wide screen microcomputer 24E sets a data which will be transmitted in the data line when the clock signal CLK is set at a high level( ). After that, the acknowledge signal ACK is set at a high level ( ), whereby the main microcomputer 23 reads the data. Lastly, the main microcomputer 23 sets the clock signal CLK at a low level to inform that the data has been read ( ). Then, the sequence is repeatedly carried out from step .

The receive/send process of the protocol defined according to the present invention will be described.

TABLE 2

A receive/send example of the protocol in accordance with the presence of an inputted video signal and the change thereof.

| | input change | signal presence | V/HSYNC shifting | receive data |
|---|---|---|---|---|
| 1) no video signal | X | 0 | X | X |
| 2) change video signal | 1 | X | X | X |

When there is no inputted video signal, as shown in 1) of Table 2, only 4 bits are transmitted to the exclusive wide screen microcomputer 24E. Here, the exclusive wide screen microcomputer 24E discontinues the wide screen detecting operation.

When the inputted video signal is changed, as shown in 2) of Table 2, only 4 bits are transmitted to the exclusive wide screen microcomputer 24E. Here, the exclusive wide screen microcomputer 24E initializes a data for wide screen detection, and then starts the wide screen detecting operation.

TABLE 3

A receive/send example of the protocol defined when the data in accordance with the start/width of the video signal is needed.

| input change | signal presence | V/HSYNC shifting | receive data | 4:3 mode | caption presence | start time | video width |
|---|---|---|---|---|---|---|---|
| 0 | 1 | X | 0 | 0 | X | B | B |

When the data in accordance with the start/width of the video signal is needed, as shown in Table 3, the data is transmitted to the exclusive wide screen microcomputer 24E.

TABLE 4

A receive/send example of the protocol defined in a case where the detected wide mode is 4:3, when the data in accordance with the start/width of the video signal is needed.

| input change | signal presence | V/HSYNC shifting | receive data | 4:3 mode |
|---|---|---|---|---|
| 0 | 1 | X | 0 | 1 |

In the case where the detected mode is 4:3, when the data in accordance with the start/width of the video signal is needed, as shown in Table 4, the data is transmitted to the exclusive wide screen microcomputer 24E.

TABLE 5

A receive/send example of the protocol defined when
the data is needed as a picture mode.

| input change | signal presence | V/HSYNC shifting | receive data | 4:3 mode |
|---|---|---|---|---|
| 0 | 1 | X | 1 | 0 |
| 4:3 mode | caption presence | | picture mode | |
| 0 | X | | B | |

When the data is needed as the picture mode, the data, as shown in Table 5, is transmitted to the exclusive wide screen microcomputer 24E.

TABLE 6

A receive/send example of the protocol defined in the case where a
wide mode is 4:3, when the data is needed as a picture mode.

| input change | signal presence | V/HSYNC shifting | receive data | 4:3 mode |
|---|---|---|---|---|
| 0 | 1 | X | 1 | 1 |

In the case where the detection mode is 4:3, when the data is needed as the picture mode, the data, as shown in Table 6, is transmitted to the exclusive wide screen microcomputer 24E.

TABLE 7

A receive/send example of the protocol defined in the case where
V/HSYNC is shifted when the wide mode is the zoom mode.

| input change | signal presence | V/HSYNC shifting | receive data |
|---|---|---|---|
| 0 | 1 | 1 | 0 |
| 4:3 mode | caption presence | start time | video width |
| 0 | X | B | B |

When the wide mode is the zoom mode, and the vertical synchronizing signal VSYNC and the horizontal synchronizing signal HSYNC are shifted, the protocol, as shown in Table 7, is different from the previous protocol only in the point that the bit indicating shifting of the vertical synchronizing signal VSYNC and the horizontal synchronizing signal HSYNC is "1".

Figure 8:
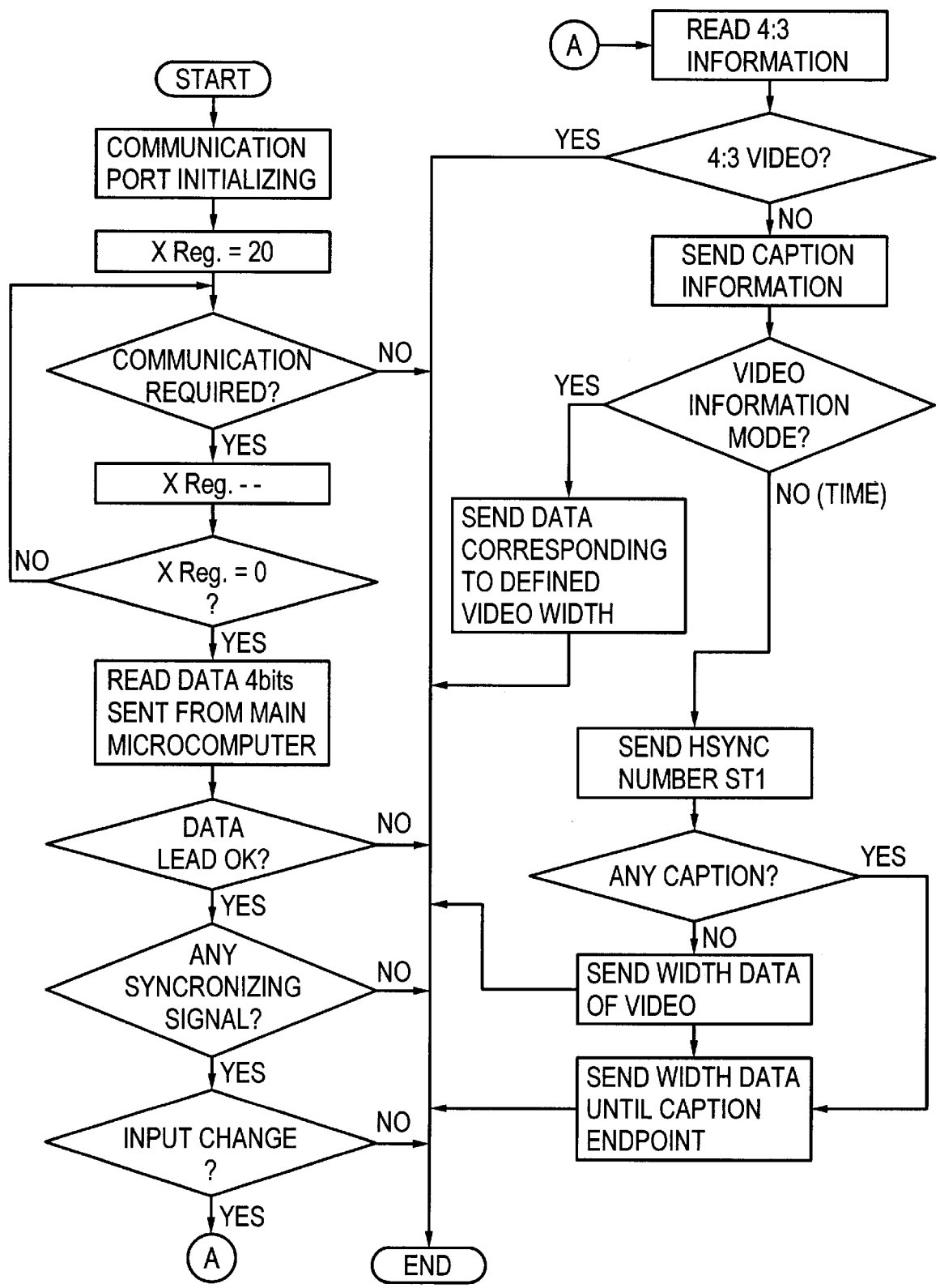
FIG. 8 is a flowchart illustrating a data send/receive sequence diagram in the apparatus of FIG. 2.

The data receive/send process between the main microcomputer 23 and the exclusive wide screen microcomputer 24E will be described with reference to FIG. 8.

In order to receive/send an aspect ratio detection data, a communication port is initialized and a value of a register XREG is set as "20". If communication is required thereafter, a data of 4 bits sent from the main microcomputer 23 is read when a value of the above register XREG becomes "0". Here, if the data is normally read, a synchronizing signal exists, and the input signal is not changed, then a screen information of 4:3 is transmitted to the main microcomputer 23. The information is checked to determine whether or not it is a 4:3 screen. If it is not the 4:3 screen information, a caption information is transmitted, and if the screen information corresponds to a mode, a defined screen width data is transmitted. If the screen information is a time information, the number of the horizontal synchronizing signals HSYNC is transmitted from the video signal start point, and then if there is a caption, a width data is transmitted until the caption end point. If there is no caption, a video width data is transmitted.

The automatic wide screen detection method according to the present invention is performed such that the main microcomputer 24E detects which aspect ratio a current video signal has by using the vertical synchronizing signal VSYNC and the input signal VDS for detecting the video signal presence.

On the basis of the falling edge of the vertical synchronizing signal VSYNC inputted to the exclusive wide screen microcomputer 24E, as shown in FIG. 9A, the aspect ratio of the input signal VDS for detecting the video signal presence is detected. Here, the exclusive wide screen microcomputer 24E is synchronized by the video signal, for thereby detecting a start point of the video signal and a video width ED1 or ED2 from the start point ST1 of the input signal VDS.

Table 8 illustrates an example of the respective data in accordance with a 4:3 video signal to a minimum video signal. That is, Table 8 defines the highest and lowest limit values with respect to a start point of each aspect ratio mode and video width, used for discriminating an aspect ratio data of an inputted video signal according to the present invention.

TABLE 8

Data of highest and lowest limit values of a signal for detecting
video signal information. (the highest and lowest limit values of the
center location: 133–141)

| | ST1 | ED1 | ST1 | ED2 | REMARK |
|---|---|---|---|---|---|
| 4:3 signal (1.33:1) | 11 | 225 | ED + 5 | 7 | change to spectacle mode |
| | 25 | 234 | <ST2 <ED1 + 32 | <ED2–ST2 <26 | |
| vista picture (1.68–1.85:1) | 25 | 181 | | | change by adjusting deflection data corresponding to screen |
| | 47 | 224 | | | |
| cinema picture (2.35:1) | 47 | 135 | | | |
| | 70 | 180 | | | |
| minimum video signal | 70 | 116 | | | |
| | 79 | 134 | | | |

Figure 10:
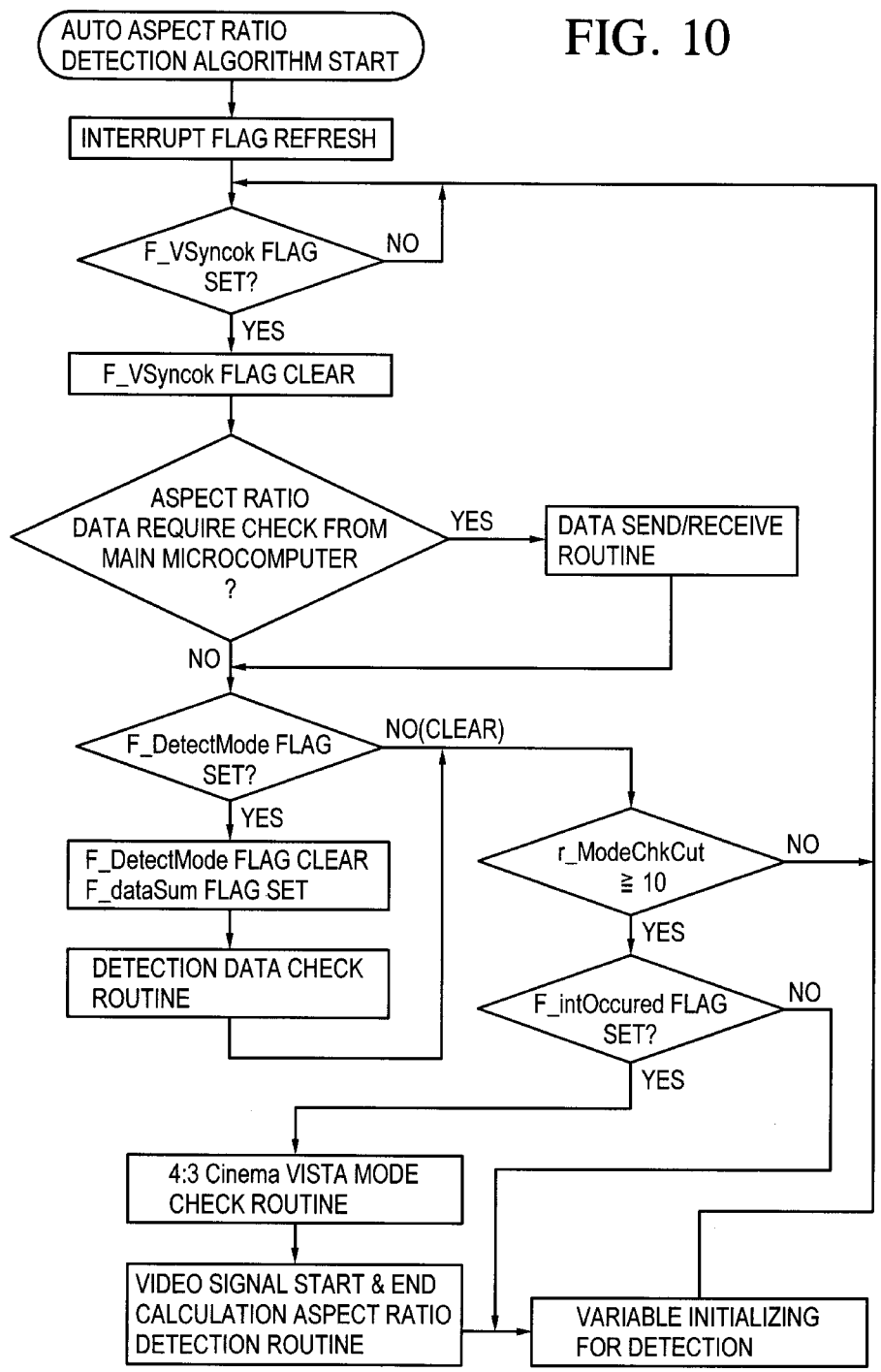
FIG. 10 is a flowchart illustrating the complete operation sequence of the exclusive wide screen microcomputer in the apparatus of FIG. 2 according to the present invention.

With reference to FIG. 10, the process of detecting a video signal information by using the start point and width data of the video signal obtained from the previous interval of the vertical synchronizing signal VSYNC by an interrupt at the point in time at which the vertical synchronizing signal VSYNC starts will now be described.

When a vertical synchronizing OK flag F_VSYNCOK is set, it means that a new vertical synchronizing signal VSYNC has started, and at this time, the vertical synchronizing OK signal F_VSYNCOK is cleared for the next step. And then, if the main microcomputer 23 requires a video information, the exclusive wide screen microcomputer 24E transmits the video information detected up to that time by performing the data receive/send routine.

If video information is not required, however, the exclusive wide screen microcomputer 24E checks a detecting mode flag F_DetectMode Flag whether an effective video signal was detected in the previous interval of the vertical synchronizing signal VSYNC, and, if detected, the detecting mode flag F_DetectMode Flag is cleared, and then a data sum flag F_DATASum Flag is set. By carrying out a detecting data check routine, the exclusive wide screen microcomputer 24E checks to which aspect ratio the video signal belongs among the 4:3, vista, cinema, and least video modes, and adds a horizontal synchronizing signal HSYNC which informs video start and video width values obtained up to that time, for thereby obtaining a mean value.

An aspect ratio detecting counter is checked in order to integrate video information obtained over 10 intervals of the vertical synchronizing signal VSYNC, defined for detecting a final video information. If the video information was obtained less than ten times, the exclusive wide screen microcomputer 24E again awaits the vertical synchronizing signal VSYNC, and if the video information is obtained more than ten times, the exclusive wide screen microcomputer 24E checks through an interrupt occurred flag F_IntOccured Flag whether the video signal is inputted from the previous vertical synchronizing signal VSYNC.

If the video signal is inputted, the exclusive wide screen microcomputer 24E checks to which aspect ratio the video signal belongs among the 4:3, vista, cinema, and least video modes for ten intervals of the vertical synchronizing signal VSYNC, and, in order to get more detailed video information, a picture mode corresponding to an information of the start and end points of the video signal and the previously defined video width is obtained. After that, the exclusive wide screen microcomputer 24E initializes all the variables used for obtaining an information for the next ten intervals of the vertical synchronizing signal VSYNC, and awaits the next vertical synchronizing signal VSYNC.

Figure 11:
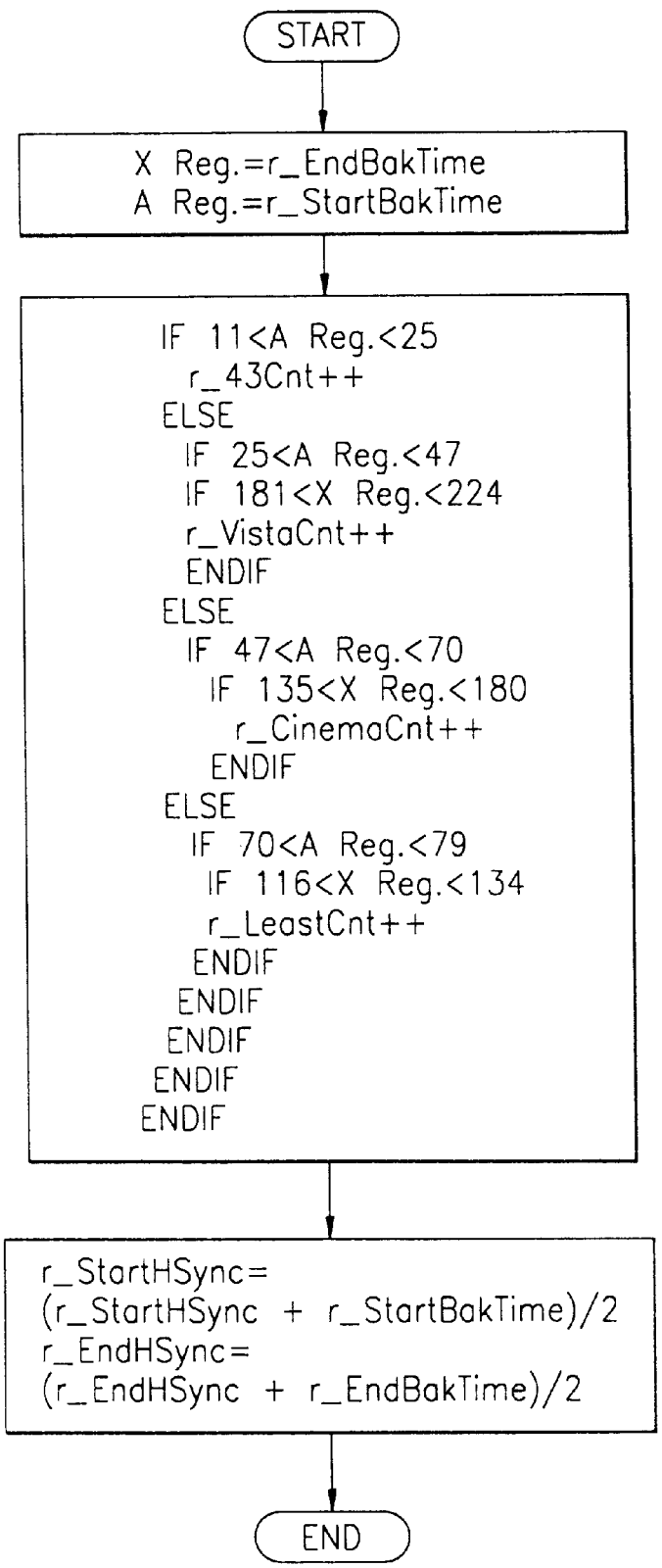
FIG. 11 is a flowchart illustrating a data discrimination sequence of the exclusive wide screen microcomputer in the apparatus of FIG. 2 according to the present invention.

As shown in FIG. 11, the detecting data check routine detects to which mode the data corresponding to the video signal start point and the video width belongs among the highest and lowest limit values using each aspect ratio mode defined in Table 8, thereby increasing a count value corresponding to an aspect ratio one by one.

That is, the detecting data check routine checks to which mode the data belongs among the 4:3, vista, cinema, and least video modes, thereby increasing the count value of a corresponding video mode, and adds the information of the horizontal synchronizing signal HSYNC and the video width to the previous information, for obtaining a mean value and updating. The data corresponding to the horizontal synchronizing signal HSYNC and the video width is same as the data highest and lowest limit values of the signal in Table 8.

Figure 12:
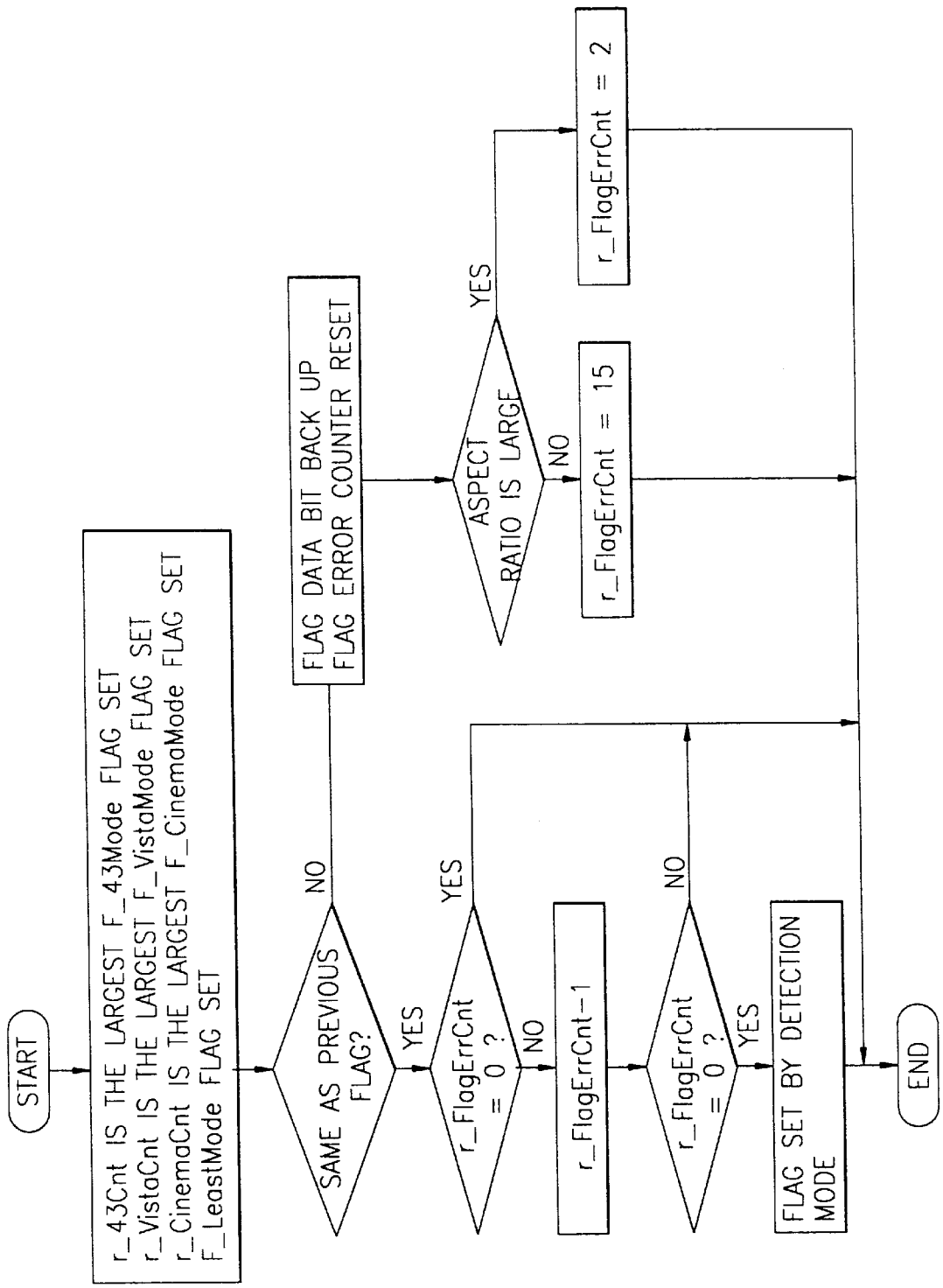
FIG. 12 is a flowchart illustrating a 4:3, vista, cinema, and least modes discrimination sequence according to the present invention.

As shown in FIG. 12, when ten effective input signals VDSs for detecting the video signal presence are inputted, by using the increased count value, the aspect ratio check routine checks to which aspect ratio the last inputted video signal belongs among the 4:3, vista, cinema, and least video modes.

In other words, the above check routine detects which video mode is currently displayed on the basis of effective video information for ten intervals of the vertical synchronizing signal VSYNC. That is, if a video mode detected in the ten intervals of the vertical synchronizing signal VSYNC is the same as the previously set video mode, the routine checks whether a value of a flag error counter r_FlagErrCnt is "0". If the value is "0", the routine ends, but if not, the routine decreases the value of the flag error counter r_FlagErrCnt by "1" and again checks whether the value is "0". Here, if "0", the currently detected video mode is discriminated as a real mode, and a mode flag corresponding to the video information is set. However, if the value is not "0", the routine is repeated.

In the case where the video mode detected for the ten intervals of the vertical synchronizing signal VSYNC is different from the previous video mode, an information corresponding to the detected video mode is backed up to the mode flag, and then a value of the flag error counter r_FlagErrCnt is initialized. If the currently detected video mode has a larger aspect ratio than the previous video mode, detection of the video mode for ten intervals of the vertical synchronizing signal VSYNC is repeated twice, and if the currently detected video mode has a smaller aspect ratio than the previous video mode, the detection is repeated for 15 times.

Figure 13:
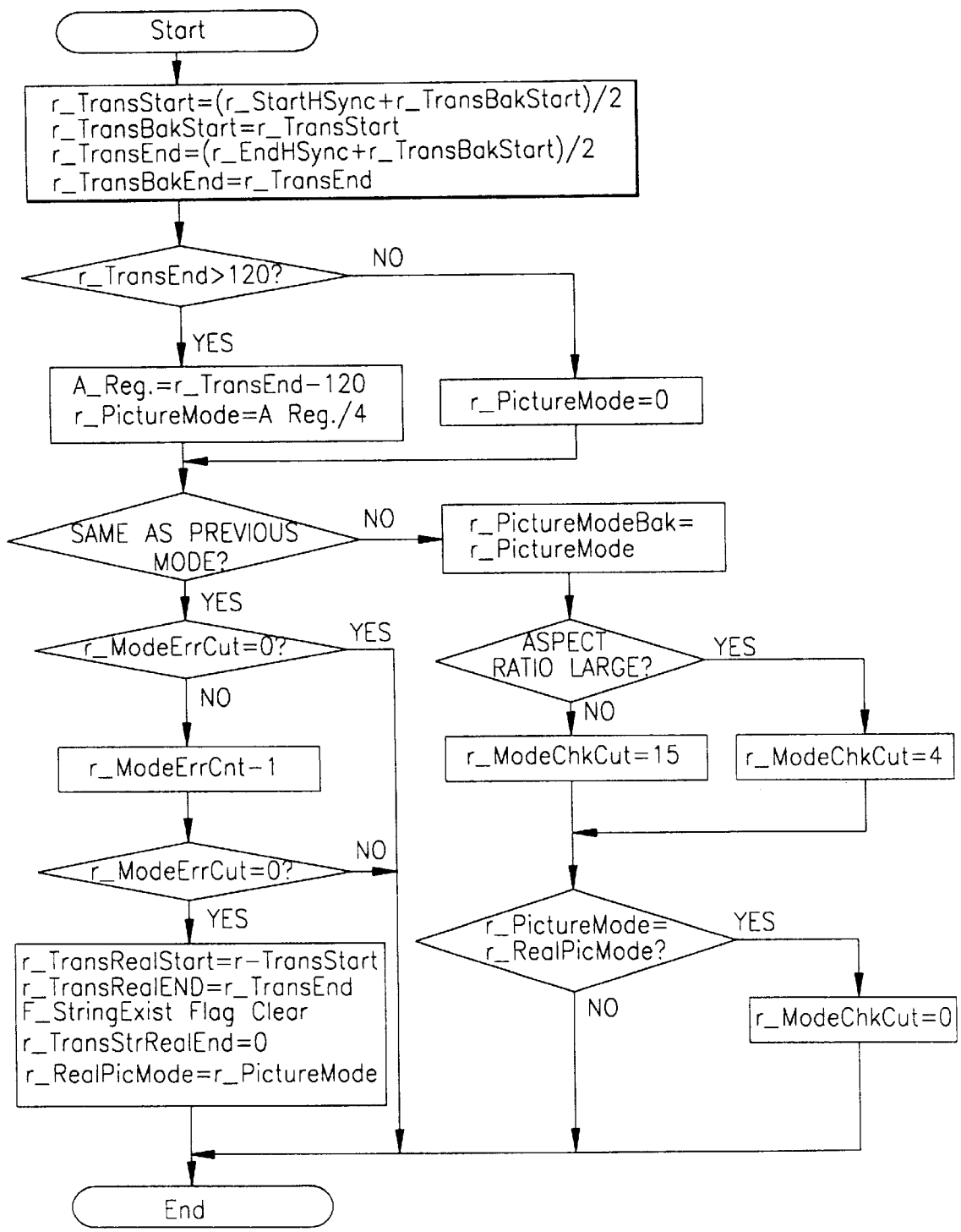
FIG. 13 is a flowchart illustrating a video signal start and width calculation and video mode discrimination sequence according to the present invention.

As shown in FIG. 13, a video signal start and width calculation and video mode discrimination routine divides the data corresponding to the video signal start point and the video width into a data which will be transmitted to the main microcomputer 23 and a data corresponding to an input video width by obtaining a mean value for the ten intervals of the vertical synchronizing signal VSYNC, thereby obtaining a defined picture mode. Since the information of the video signal start point and the video width obtained for the ten intervals of the vertical synchronizing signal VSYNC is added to the currently detected information, whereby a mean value is obtained, and a case where the video signal exists for 120 intervals of the vertical synchronizing signal HSYNC is defined as a minimum mode, a video mode can be obtained by using the current video width. If the video width is less than 120 pulses of the horizontal synchronizing signal HSYNC, the video mode is defined as "mode 0", and the video mode is obtained at 4 intervals of 120 pulses.

If the above obtained video mode is the same as the video mode obtained for the previous ten intervals of the vertical synchronizing signal VSYNC, the routine checks whether or not a value of the flag error counter r_FlagErrCnt is "0", and if "0", the routine comes to an end. And, if not "0", the routine subtracts "1" from the value and again checks whether it is "0". After that, if the result is "0", the currently obtained video mode is a mode corresponding to a real mode, thereby being stored in a real picture mode flag r_RealPicMod Flag. At this time, an information of the video signal start point and video width is stored in a start flag r_TrasRealStart Flag and an end flag r_TransRealEnd Flag, and a caption discriminating flag F_StringExist Flag is cleared in order that the caption discrimination may be performed again.

However, if the result of subtracting "1"from the value is not "0", the routine ends. When the currently detected video mode is different from the previous mode, the currently detected mode is backed up to a picture mode back up flag r_PictureModeBak Flag. It is thus discriminated whether the video width is increased or decreased, and if increased, a mode check for ten intervals of the vertical synchronizing signal VSYNC is performed 4 times, and if decreased, the mode check is performed 15 times. However, if the currently detected mode is the same as a real mode r_RealPicMod, the mode check counter r_ModeChkCnt is reset as "0", for preventing a transitionally changing video mode from being erroneously detected.

Figure 14:
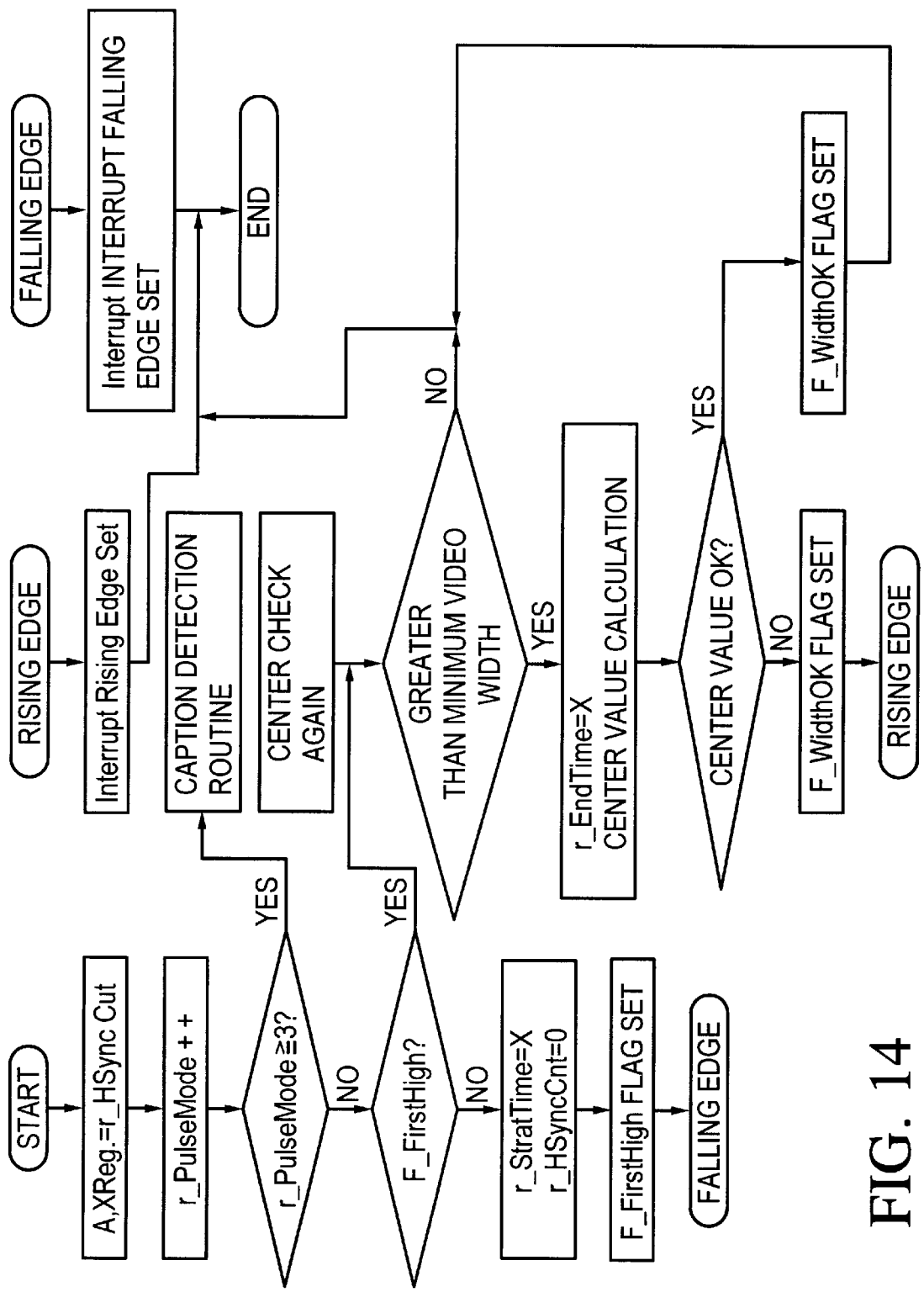
FIG. 14 is a flowchart illustrating a wide screen detection sequence diagram by using a signal for detecting a video signal presence according to the present invention.

As shown in FIG. 14, a video aspect ratio data detecting routine is synchronized by the vertical synchronizing signal VSYNC and detects a data corresponding to the video start point and video width by using the input signal VDS for detecting the video signal presence.

A horizontal synchronizing counter r_HSyncCnt takes a value of the A and X registers set in the routine of FIG. 11. After that, a count value of a pulse mode counter r_PulseModeCnt is increased by "1". If the increased value is more than "3", the video aspect ratio data detecting routine returns to a caption detecting routine. However, if less than "3", the routine checks a rising edge detecting flag F_FirstHigh Flag, for thereby confirming whether or not the first rising edge is detected. In result, if the rising edge detecting flag F_FirstHigh Flag is cleared, it is judged as the first rising point of the input signal VDS for detecting the video signal presence, whereby the horizontal synchronizing counter r_HSyncCnt is initialized as "0", and the rising edge detecting flag F_FirstHigh Flag is set.

An interrupt flag is set so that an interrupt occurs on the falling edge. After that, since the interrupt occurs on the falling edge and the rising edge detecting flag F_FirstHigh Flag is set, the above horizontal synchronizing counter r_HSyncCnt has an information corresponding to a video width. Here, if the video width is larger than a minimum video width, e.g., 120, the video width is first stored in an end time buffer r_EndTime, a center value of video location is obtained by using the values in each of the end time buffer r_EndTime and a start time buffer r_StartTime. Here, if the obtained center value is within a defined range (Center=r_StartTime+r_EndTime/2), that is 133<Center<141, a width OK flag F_widthOKFlag is set, and if not, the routine goes to an interrupt subroutine. If the count value of the pulse mode counter r_PulseModeCnt is more than "3", the caption detecting routine starts, for thereby judging whether or not a caption exists.

Figure 15:
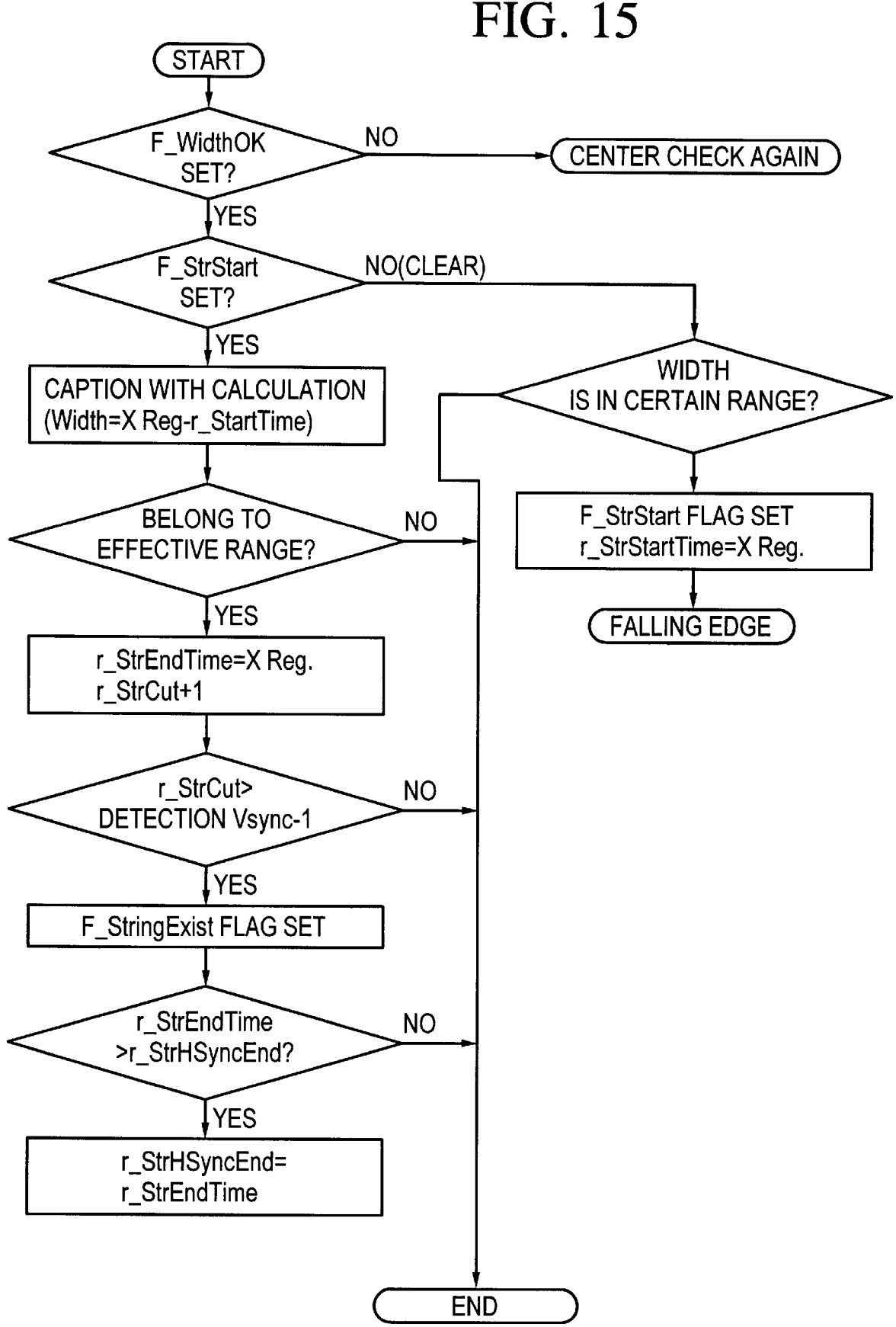
FIG. 15 is a flowchart illustrating a caption discrimination sequence according to the present invention.

As shown in FIG. 15, the caption detecting routine detects a data on the basis of the input video width at a caption end point when the pulse of the input signal VDS for detecting the video signal presence in FIG. 14 is analyzed and a caption exists.

First, if the width OK flag F_WidthOK Flag is cleared, the center is checked again, and if the center is set, the routine checks whether a caption rising edge is inputted. If a start flag F_StrStart Flag is cleared, and an interval between a video end point and a caption start point is within a defined range, the start flag F_StrStart Flag is set, a count value of the horizontal synchronizing counter r_HSyncCnt at this point is stored in the start time buffer r_StartTime, and an interrupt flag is set so that an interrupt occurs on the falling edge.

However, if the start flag F_StrStart Flag is set, a current count value of the horizontal synchronizing counter r_HSyncCnt is the value of the falling edge of the caption signal, whereby a width of the caption signal can be calculated by using the count value of the horizontal synchronizing counter r_HSyncCnt and the value of the start time buffer r_StartTime. If the width is within a defined range, it is judged that the caption exists, whereby the count value of the start counter r_StrCnt is increased by "1", and the count value of the horizontal synchronizing counter r_HSyncCnt at this point is stored in the end time buffer r_EndTime.

Although a value of the start counter r_StrCnt has 9 intervals of the vertical synchronizing signal VSYNC which has a one interval difference from the 10 intervals of the vertical synchronizing signal, the standard of video discrimination, it is considered that there is the caption, whereby a caption discrimination flag F_StringExist Flag is set. The currently detected value of the end time buffer r_EndTime is compared with the previously detected last value of the horizontal synchronizing signal HSYNC. If the value of the end time buffer r_EndTime is greater than the value of the horizontal synchronizing signal HSYNC, the currently detected end time r_StrEndTime is stored in a horizontal synchronizing buffer r_StrHSyncEnd.

Figure 16:
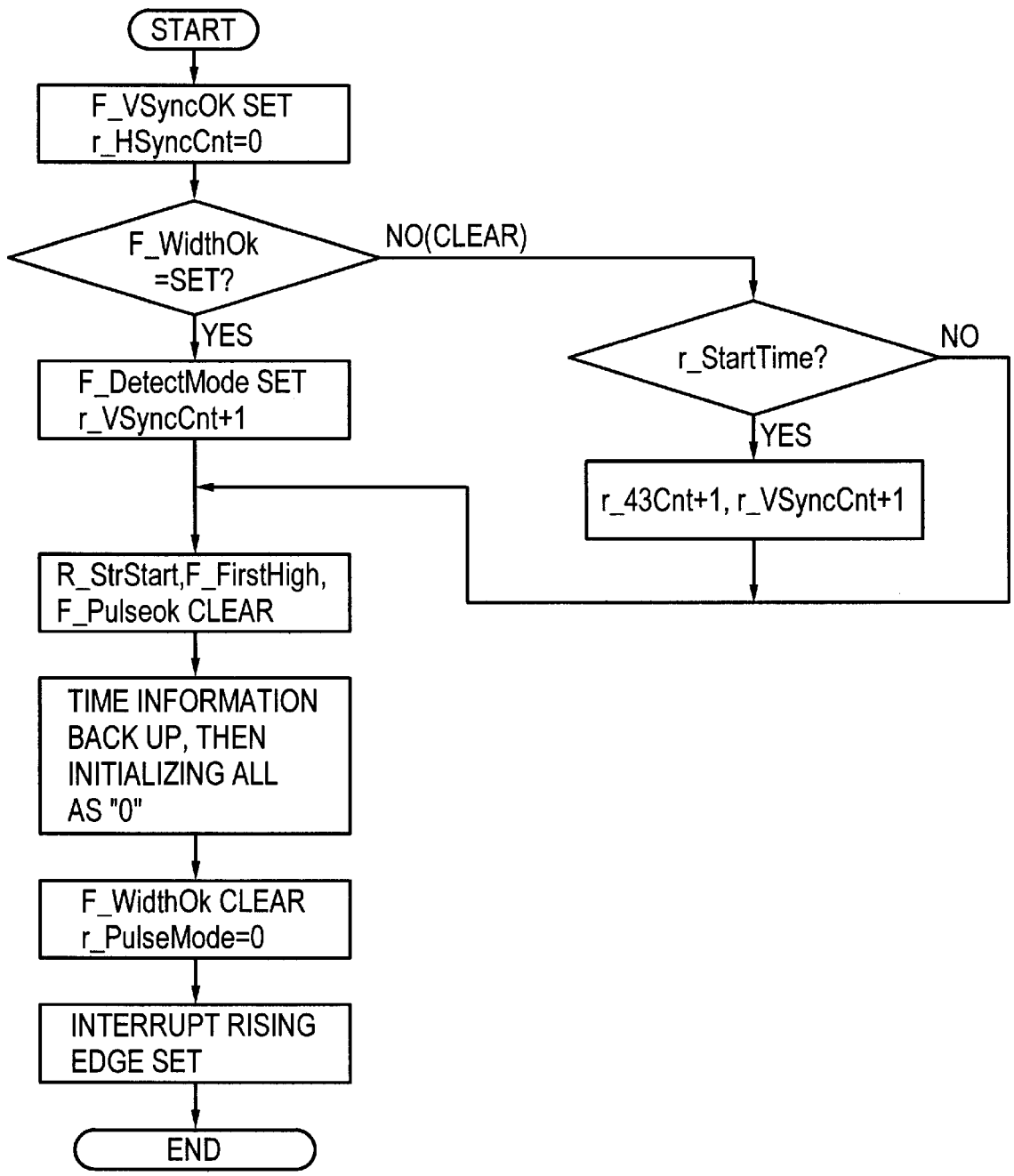
FIG. 16 is a flowchart illustrating a vertical synchronizing interrupt sequence according to the present invention.

As shown in FIG. 16, if the input signal VDS for detecting the video signal presence is detected during the previous interval of the vertical synchronizing signal VSYNC for every vertical synchronizing signal VSYNC, a vertical synchronizing interrupt process routine stores the detected data signal to be integrated and initializes the variables defined for detecting the signal VDS in the following interval of the vertical synchronizing signal VSYNC.

In other words, a vertical synchronizing interrupt occurs on a falling edge of the vertical synchronizing signal VSYNC. Here, a vertical synchronizing OK flag F_VSyncOK Flag is set first, thereby informing the main routine that the vertical synchronizing signal VSYNC is generated, and a value of the horizontal synchronizing counter r_HSyncCnt is initialized as "0" so as to discriminate the video signal. If the width OK flag F_WidthOK Flag is cleared, a value of the start time buffer r_StartTime is checked, thereby checking whether the value is located in the start point of the 4:3 video signal. If the value is in the start point of the 4:3 video signal, the count value of each of a counter r_43Cnt and the vertical synchronizing counter r_VSYNCCnt is increased by "1".

If the width OK flag F_WidthOK Flag is set, namely, when an effective video signal was inputted during the previous interval of the vertical synchronizing signal VSYNC, a detect mode flag F_DetectModeFlag is set, and the value of the vertical synchronizing counter r_VSyncCCnt is increased by "1". Also, an information corresponding to the obtained video signal, namely, the values of the start time r_StartTime, r_StrStartTime, and the end time r_EndTime, r_StrEndTime are backed up and initialized as "0". Then, an interrupt is set to occur on a rising edge in order to discriminate the input signal VDS.

Figure 17:
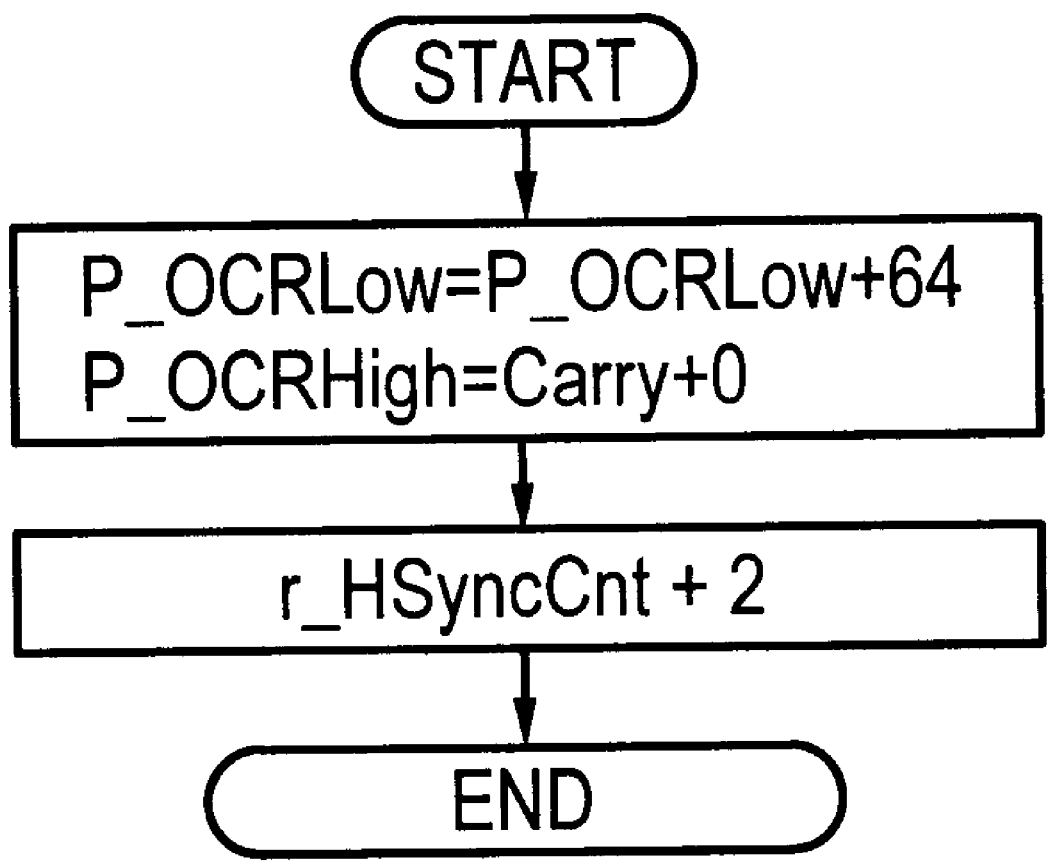
FIG. 17 is a flowchart illustrating a vertical synchronizing detection sequence by using a timer according to the present invention.

As shown in FIG. 17, a horizontal synchronizing signal detecting routine using a timer updates the timer value so that a count value of the vertical synchronizing counter r_HSyncCnt is increased by "2" every 128 μs, corresponding to two intervals of the horizontal synchronizing signal HSYNC. That is, the count value is increased by "2" every 128 μs in order to represent the information corresponding to the video aspect ratio as the number of vertical synchronizing signals.

Figure 18:
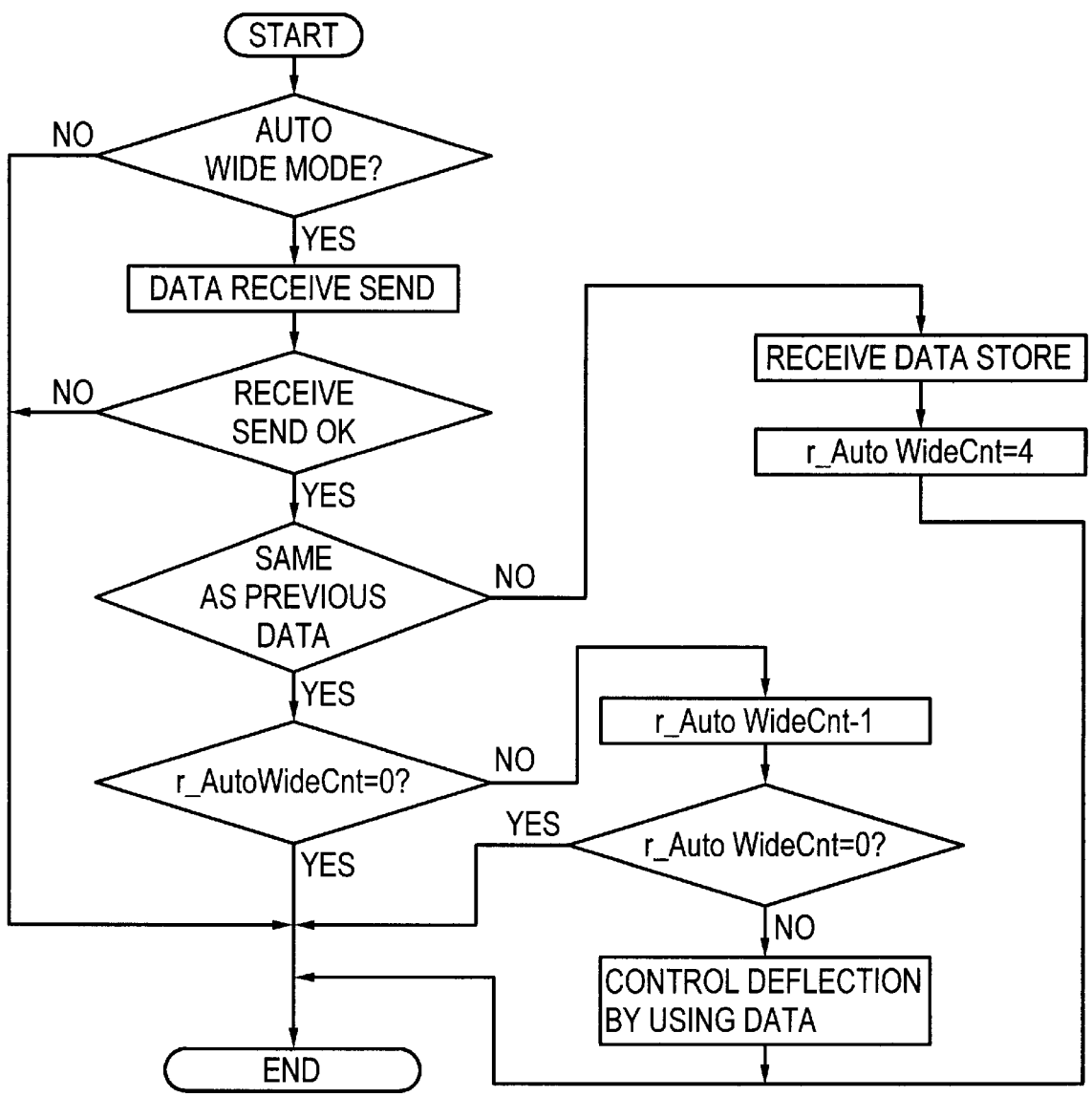
FIG. 18 is a flowchart illustrating an automatic wide mode change sequence of the main microcomputer according to the present invention.

At the end, in the case where the automatic wide mode is set by the user, as shown in FIG. 18, in a routine in which the main microcomputer 23 receives data of the video aspect ratio from the exclusive wide video microcomputer 24E every 250 μs and controls a deflection data of a displayed video signal, the main microcomputer 23 checks every 250 μs whether it is the automatic wide mode. If the automatic wide mode is detected, the main microcomputer 23 receives the video aspect ratio data. When the data receiving is normally completed, the data is compared with the previously received data. If this data is different from the previously received data, it is considered as a real input video signal and its deflection is controlled. However, if the data are the same, a count value of an automatic wide counter r_AutoWideCnt is checked. If the value is "0", it is judged that the deflection is already controlled to the automatic wide screen mode, whereby the routine is completed. However, if the value is not "0", "1" is subtracted from the value and then the value is checked again. If the result is not "0", the routine is completed. But if it is "0", a deflection data is obtained corresponding to the input video aspect ratio by using the received video aspect ratio and written in the integrated deflection device 26, whereby the video image is displayed on the entire screen of the CPT.

As described above, the present invention enables a TV set to automatically detect the video signal aspect ratio and change an aspect ratio mode without requiring a manual change of the aspect ratio mode by the user, thereby providing convenience in using the TV. Also, the present invention controls the deflection by more variously detecting aspect ratios of the input video signal than the conventional limited aspect ratio mode, thereby satisfying different tastes of TV viewers.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. An automatic wide screen display method for a TV set, comprising:

determining whether or not an input signal is a wide screen video signal, generating a video aspect ratio signal based on the determination, and determining with an exclusive wide screen microcomputer an aspect ratio of the input signal using a vertical synchronizing signal by synchronizing the video aspect ratio signal with the vertical synchronizing signal;

performing communication by a defined communication protocol between a main microcomputer for controlling deflection of an imaging device and the exclusive wide screen microcomputer; and controlling an integrated deflection device on the basis of a result of the communication performed in the performing step for displaying an image on the imaging device in accordance with the aspect ratio of the input signal.

2. The method of claim 1, wherein in the performing step, the defined communication protocol comprises;

a first data transmitted from the main microcomputer to the exclusive wide screen microcomputer in relation to an automatic wide mode operation, a 4:3 aspect ratio mode information defined for transmitting an information corresponding to the aspect ratio detected by the exclusive wide screen microcomputer, and a third data by which a caption information pr es en ce and a start point and width of the input signal are represented in relation to a width of a horizontal synchronizing signal.

3. The method of claim 2, further comprising:

a step wherein if a communication port is initialized and a register is set as a certain value to shorten a send/receive time of the defined communication protocol, and the set register value becomes "0", then the first data transmitted from the main microcomputer is normally read, and thereafter if a synchronizing signal exists and if there is no change in the input signal, then the 4:3 aspect ratio information is sent to the main microcomputer.

4. The method of claim 1, wherein the determining step uses a table, which defines highest and lowest limit values with respect to a start point of each aspect ratio mode and image width of a video signal, to determine the aspect ratio of the input signal.

5. The method of claim 1, wherein the determining step comprises the step of:

integrating and indicating information corresponding to the input signal by using a start point and width data of the input signal obtained from a previous interval of the vertical synchronizing signal.

6. The method of claim 5, further comprising:

performing a detecting data check routine for detecting to which mode a data corresponding to the start point of the input signal and the width data of the input signal obtained from the previous interval of the vertical synchronizing signal belongs among highest and lowest limit values with respect to a start point of each aspect ratio mode and video width, for increasing a count value corresponding to each aspect ratio mode one by one.

7. The method of claim 6, further comprising;

performing a 4:3, vista, cinema and least video mode check routine for determining to which mode a lastly inputted video signal belongs among defined video modes when a certain number of effective input signals for detecting a video signal presence are inputted by using an increased count value.

8. The method of claim 1, wherein the determining step comprises the step of:

calculating a mean value of a certain number of vertical synchronizing signal intervals, for obtaining a defined picture mode divided into a data which is transmitted to the main microcomputer and a width data of the input signal.

9. The method of claim 1, wherein the determining step comprises the step of:

detecting a data corresponding to a video start point and a video width by using a currently inputted video type determination signal being synchronized by the vertical synchronizing signal.

10. The method of claim 9, further comprising:

performing a detection routine for detecting the data corresponding to the video width from a caption end point if a caption exists in the input signal.

11. The method of claim 1, wherein the determining step comprises the step of:

performing a vertical synchronizing interrupt routine for storing data to be integrated, if the video type determination signal is detected during a previous interval of the vertical synchronizing signal, and initializing variables defined for detecting the video type determination signal during a subsequent interval of the vertical synchronizing signal.

12. The method of claim 1, further comprising:

periodically increasing a count value of a vertical synchronizing counter so as to represent the aspect ratio as the number of occurrences of the vertical synchronizing signal.

13. The method of claim 1, wherein when the exclusive wide screen microcomputer periodically detects data and aspect ratio of a video signal inputted for a certain period, the controlling step comprises the step of controlling deflection data so that the inputted video signal can be displayed on the entire wide screen.

14. In a TV set provided with a wide screen display function for displaying a wide screen image by selecting a certain input signal among a broadcasting signal and a plurality of external input signals, an automatic wide screen display apparatus comprising:

a main microcomputer for controlling deflection data of an integrated deflection device to display a screen image which accords with a corresponding aspect ratio data of an input video signal; and a wide screen detection unit for determining the presence of a wide screen video signal and generating a wide screen video presence signal for indicating the presence of the wide screen video signal based on determination result, the wide screen detection unit communicating with the main microcomputer in accordance with a defined communication protocol and detecting the aspect ratio data of the input video signal using a vertical synchronizing signal by synchronizing the wide screen video presence signal with the vertical synchronizing signal.

15. The apparatus of claim 14, wherein the wide screen detection unit comprises:

a synchronizing/separating unit for synchronizing and separating a luminance signal component from the input video signal; and a pulse generation unit for clamping an output signal from the synchronizing/separating unit and generating a clamping pulse.

16. The method of claim 2, wherein in the performing step, the first data has four bits.

17. The method of claim 2, wherein in the performing step, the 4:3 aspect ratio mode information is represented by two bits of data.

18. The method of claim 1, wherein the determining step includes:

separating a luminance signal component from the input signal;

comparing the luminance signal component with a reference signal; and generating the video aspect ratio signal based on the comparison results.

19. The method of claim 1, wherein the determining step determines an aspect ratio of 4:3 if a duration of the video aspect ratio signal corresponds to a predetermined width of the vertical synchronizing signal.

20. The method of claim 19, wherein the predetermined width of the vertical synchronizing signal corresponds to 208 or more pulses of a horizontal synchronizing signal.

21. The apparatus of claim 15, wherein the wide screen detection unit further comprises:

a luminance signal clamping and comparing unit for clamping the luminance signal component using the clamping pulse and comparing a resultant signal with a reference signal to output the wide screen video presence signal.

22. The apparatus of claim 21, wherein the wide screen detection unit further comprises:

a latch unit for latching the wide screen video presence signal; and an exclusive wide screen microcomputer for detecting the aspect ratio data of the input video signal using an output signal from the latch unit and the vertical synchronizing signal, and transmitting the detected aspect ratio data to the main microcomputer.

23. The apparatus of claim 15, wherein the wide screen detection unit detects an aspect ratio of 4:3 if a duration of the wide screen video presence signal corresponds to a predetermined width of the vertical synchronizing signal.

24. The apparatus of claim 23, wherein the predetermined width of the vertical synchronizing signal corresponds to 208 or more pulses of a horizontal synchronizing signal.

* * * * *